United States Patent
Holle et al.

[15] 3,670,636
[45] June 20, 1972

[54] APPARATUS FOR CONTROLLING THE SHUTTER SPEED OF PHOTOGRAPHIC CAMERAS

[72] Inventors: Werner Holle, Wetzlar; Arthur Kessler, Grossaltenstadten, both of Germany

[73] Assignee: Ernst Leitz GmbH, Wetzlar, Germany

[22] Filed: Aug. 31, 1970

[21] Appl. No.: 68,373

[30] Foreign Application Priority Data

Sept. 10, 1969 Germany ..................P 19 45 709.1

[52] U.S. Cl. ..................95/10 CT, 95/53 EB, 95/55, 95/57
[51] Int. Cl. ..................G01j 1/44
[58] Field of Search ..............95/55, 57, 53 E, 53 EA, 53 EB, 95/10 CE, 10 CT

[56] References Cited

UNITED STATES PATENTS

| | | |
|---|---|---|
| 3,303,766 | 2/1967 | Karikawa..............................95/10 CT |
| 3,398,668 | 8/1968 | Starp....................................95/53 EB |
| 3,498,195 | 3/1970 | Ono.................................95/53 EB UX |

Primary Examiner—Samuel S. Matthews
Assistant Examiner—Monroe H. Hayes
Attorney—Krafft & Wells

[57] ABSTRACT

Apparatus for controlling the shutter speed of photographic cameras which includes mechanical components for controlling the shutter speed in the short-time range combined with an electric timing circuit and an electromagnet for effecting control in the long-time range.

5 Claims, 4 Drawing Figures

WERNER HOLLE
ARTHUR KESSLER
INVENTORS

BY Krafft + Wells

APPARATUS FOR CONTROLLING THE SHUTTER SPEED OF PHOTOGRAPHIC CAMERAS

CROSS-REFERENCES TO RELATED APPLICATIONS

Applicants incorporate by reference copending application Ser. No. 782,173 of Peter Loseries, filed Dec. 9, 1969, now U.S. Pat. No. 3,580,156, in the U.S. Patent Office and having the title "Swinging Sector Shutter for Photographic Cameras." The present application is assigned to the same assignee as application Ser. No. 782,173. Application Ser. No. 782,173 discloses in FIG. 8 a front view of a photographic camera wherein a swinging sector shutter and a time setting mechanism are incorporated. The combination of the shutter mechanism and the time setting mechanisms of the present invention can be incorporated into the camera housing as shown in FIG. 8 of application Ser. No. 782,173.

BACKGROUND OF THE INVENTION

The field of the invention is cameras having shutters with a delayed release. The present disclosure is particularly concerned with the combination of mechanical and electrical timers to control the shutter speed of a focal-plane shutter in photographic still cameras.

The state of the art of cameras having shutters composed of a plurality of lamellae, as used in the present invention, may be ascertained by reference to U.S. Pat. Nos. 2,927,519 of Matsuda and 3,479,946 of Bohm.

It is known in focal-plane shutters, on the one hand, to control the shutter speed mechanically, i.e., to initiate the closing movement of the second blind at a point in time after the opening of the shutter by the use of adjustable mechanical components. In the case of longer exposure times, it is known to employ a retarding unit among these mechanical components.

On the other hand, it is also conventional in such shutters to trigger the closing movement of the second blind by means of a magnet inserted in an electronic circuit and controlled by means of an RC-member (resistance-capacitance member).

However, both devices do not control the shutter speed in all timing ranges equally well or equally effectively. Thus, for example, the mechanical control devices operate especially effectively and without any great amount of complicated structure in the short-timing range, i.e., in the range wherein the traveling motion of the first shutter blind initiates the timely operative movement of the second blind, because in this range it is unnecessary to employ a retarding mechanism for control purposes. In contrast thereto, the electronic control operates advantageously in the long-timing range of, for example, about 1/100 sec. and longer, whereas, in the short-timing range, for example, the delay in attraction and release of the electromagnet has a troublesome effect.

SUMMARY OF THE INVENTION

Having in mind the limitations of the prior art, it is an object of the present invention to provide an apparatus for controlling the shutter speed, which apparatus comprises the advantages of the conventional mechanical and electronic control devices and avoids the respective disadvantages thereof.

According to the present invention, this object is achieved by providing that the control of the shutter speed, in the short-timing range, is effected in a conventional manner exclusively by mechanical structural components, whereas, for effecting the control in the long-timing range, an electronic time base circuit is provided in combination with an electromagnet, and the transition from the mechanical to the electronic time control takes place approximately at the shortest opening time of the shutter.

Accordingly, as a result of providing electronic control of the shutter speed in the long-timing range, the use of the retarding mechanism which is required in the case of mechanical time control becomes superfluous. Conversely, however, the delay in the attraction of the relay cannot have an effect in the short-timing range, where this delay would be essentially more significant, percentage wise, than is the case in the longer periods of time.

The transition from mechanical time control to electronic time control takes place suitably at approximately the shortest full open time of the shutter, since this is the longest period during which no retarding mechanism need be employed. This time, in the case of focal-plane shutters, is approximately 1/100 sec. For this purpose, the button for setting exposure time of the camera is provided with mechanical adjusting means as well as electronic adjusting means, each of which become effective in the timing range provided therefor.

However, in such a succession of different systems, there is the danger that the operative ranges thereof overlap, or that a gap remains therebetween. According to the present invention, this danger is eliminated by providing that one of the triggering systems always remains effective with a threshold value, and that the other triggering system is merely additionally connected to this threshold value and overlaps it. For example, the arrangement is such that the electric release constantly remains effective with the threshold value of, for example, 1/100 sec. If a shorter time is set, the mechanical means trigger the second shutter blind prior to the expiration of this 1/100 sec., but, independently thereof, the electronic release also begins to function after 1/100 sec. At that point in time, the second blind has already been triggered, and the electronic triggering step is not functioning but this has no effect on the shutter operation.

However, on the other hand, the arrangement can also be such that the mechanical triggering remains in effect with its threshold value of about 1/100 sec., and this mechanical triggering function is suppressed by the connected electronic circuit until the set, longer period of time has passed. If, in such a shutter, the electronic circuit were to become inoperative, the shutter would still remain operable with about 1/100 sec. as the longest shutter speed. However, the more important aspect is that both arrangements have in common that gaps between the mechanical and the electronic triggering systems are avoided. Although the instant of transition from the mechanical to the electronic triggering can shift somewhat, depending on the adjustment, no gap can occur between both triggering systems, so that an expensive, extremely accurate adjustment likewise becomes dispensable.

According to the invention, conventional mechanical components are provided as setting means for the mechanical time control, for example in the form of cam-regulated slides and stops, whereas a variable resistor is connected with the time setting button as the adjusting means for the electronic time control.

BRIEF DESCRIPTION OF THE DRAWINGS

Additional details of the invention are explained in greater detail with reference to the drawings in connection with an embodiment of a focal-plane shutter with rigid individual slides, wherein.

DESCRIPTION OF THE PREFERRED EMBODIMENTS

Figure 1:
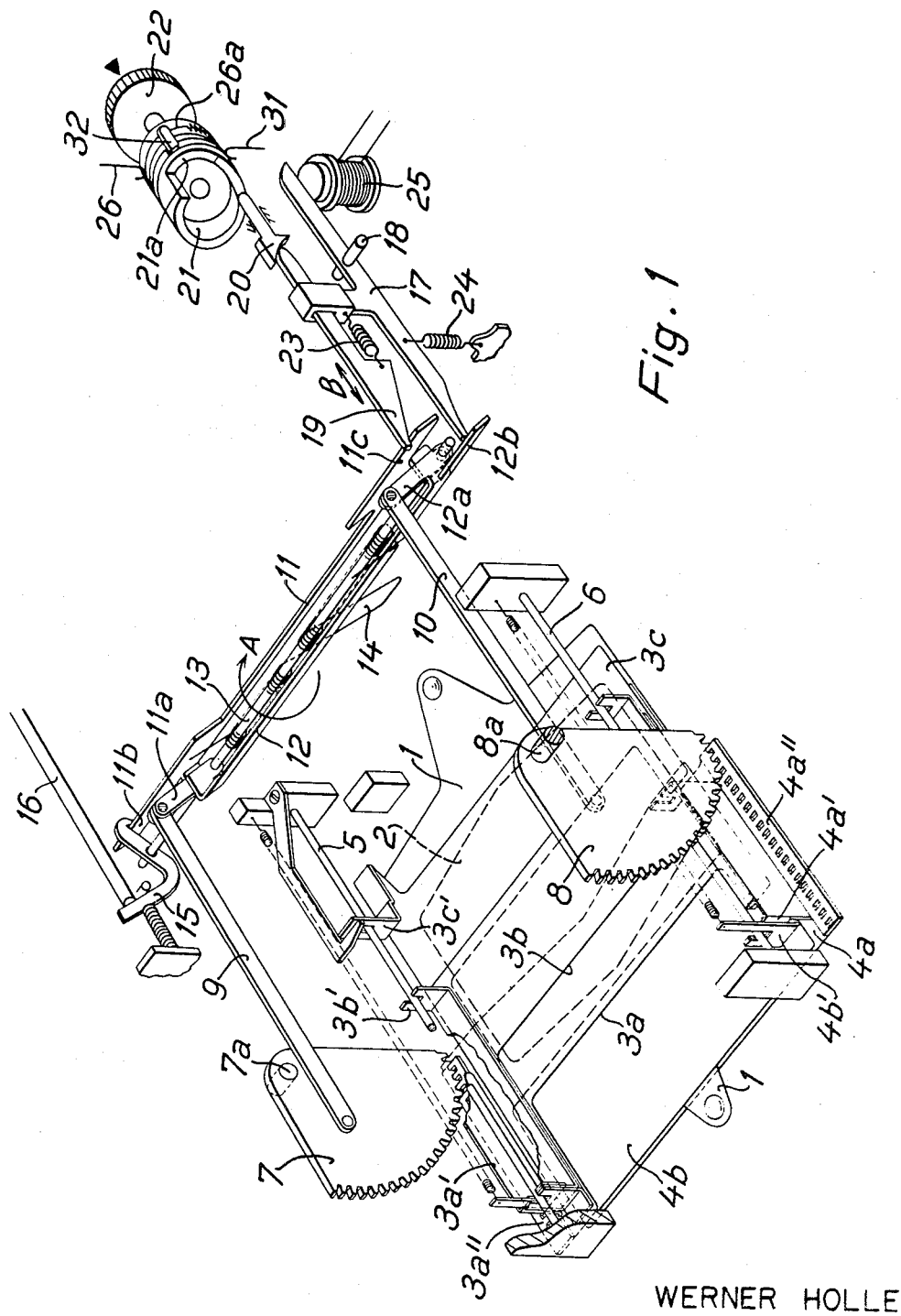
FIG. 1 shows a schematic perspective view of a focal-plane shutter with a speed control device according to the invention.

With particular reference to FIG. 1, the slide focal-plane shutter, which serves as an example for explaining the invention, consists of an image aperture plate 1 with the image aperture 2. In front of and behind plate 1, there moves respectively one slide of the focal-plane shutter. Each slide is composed of several lamellae, which telescopically draw apart or meet during operation. Namely, the slide which covers, in the cocked shutter condition, the image aperture 2, consists of the lamellae 3a, 3b, 3c, whereas the subsequent slide consists of the two lamellae 4a, 4b. In the cocked condition of the shutter illustrated in FIG. 2, the last-mentioned lamellae are superimposed at the left-hand lower end of the figure.

To provide guidance for the lamellae, guide rods 5 and 6 are provided in parallel on both sides of the short edge of the image aperture. The lamellae 3a, 3b, 3c are guided on the guide rod 5 by means of the tongues 3a', 3b', 3c', whereas they move, on the other side, with their flat edges in sliding guides which are not illustrated. In the same manner, the lamellae 4a, 4b are guided by means of tongues 4a', 4b' unilaterally on the rod 6.

The slit-forming lamella of each slide respectively extends with a strip toward the outside beyond the rim of the highest image aperture plate 1, and each of these strips is perforated in the manner of a toothed rack. The slides are driven in each case by way of these toothed racks 3a', or 4a', respectively, namely by means of respectively one toothed segment 7 and 8. The segment 7 engages the toothed rack 3a'' with its teeth, and the segment 8 engages the toothed rack 4a''. By means of the axles 7a and 8a, the toothed segments, 7, 8 are mounted in a fixed, but rotatable fashion in the camera housing. A push rod 9 connects the toothed segment with a driving mechanism, disposed, in the illustration according to FIG. 1, above the image aperture 2. The toothed segment 8 is connected with this driving mechanism via the push rod 10. The remaining lamellae of each slide are entrained by mutual abutment of the tongues 3a', 3a', 3c' and 4a', 4b', this entrainment motion being supported by springs.

In detail, the driving mechanism consists of two sheet metal strips 11, 12 angled in a U-shaped configuration, which strips—engaging each other in an offset manner—are rotatably mounted in a coaxial fashion on a stationary axle 13. The strip 11 exhibits an arm 11a effective as a crank, which arm is rotatably coupled to the push rod 9 and, in the same manner, the strip 12 has an arm 12a rotatably connected with the push rod 10. The entire system represents two slide-crank gears, each of which drives one of the toothed segments.

On the axle 13, a coil spring 14 is mounted which is oppositely wound starting from the center; with the center section of this spring, the latter is fixedly supported, and the free ends thereof are effective on respectively one of the strips 11, 12. Under the force of this spring 14, the strips 11, 12 pivot, after the tripping of the shutter, in the direction of the Arrow A about the axle 13.

In the cocked condition of the shutter as illustrated in FIG. 1, the strip 11 is prevented from moving in the direction of Arrow A by the pawl 15 which engages strip 11 behind a laterally projecting tongue 11b. The strip 11 drives the push rod 9 and thus the toothed segment 7, the latter, in turn, moving the advancing slide 3. Thus, a tripping of the pawl 15 is equivalent to the beginning of the shutter operation. Accordingly, the pawl 15 is under the effect of the tripping rod 16 terminating outside of the camera housing in a release button.

The strip 12, driving the trailing slide via the push rod 10 and the segment 8, is prevented from rotating in the direction of Arrow A by means of a pawl 17 engaging a laterally projecting tongue 12b, which pawl, in order to release the lock can be tilted about a stationary axle 18.

The time interval by which the pawl 17 is tripped later than the pawl 15 determines the shutter speed with which a picture is taken. To control this time interval, mechanical as well as electronic components are provided which are described below and which represent the actual embodiments of this invention.

In order to effect a mechanical control of the shutter speed, the pawl 17 is connected with a stop lever 19, which latter is longitudinally displaceable relative to the pawl 17. The end of the stop lever 19 located in the front in FIG. 1 is provided with an inclined surface cooperating with a tongue 11c of the strip 11. The rear end of the stop lever 19 contacts a flat connecting piece 20 longitudinally displaceable together with the stop lever 19, this connecting piece, in turn, contacting with its other end an axial cam 21 fixedly connected for rotation with a time setting unit 22 accessible outside of the camera housing. The abutment of the stop lever 19 at the connecting piece 20 and the abutment of the latter at the axial cam 21 is ensured by means of a tension spring 23. Thus, by rotating the time setter 22, it is possible to shift the stop lever 19 to a greater or lesser extent in the direction of Arrow B.

The shifting of the stop lever 19 in this direction has the effect that the tongue 11c meets, during the movement of the first shutter slide, sooner or later the inclined surface of the stop lever 19. When the tongue 11c contacts this inclined surface, the stop lever 19, together with the pawl 17, is thereby pivoted about the axle 18 against the force of the spring 24, whereby the tongue 12b is freed, so that then the trailing shutter slide driven by the strip 12 also becomes operative.

However, according to the invention, the possibility of adjusting the stop lever 19 comprises only the shutter speed range from the shortest open time of the shutter, which is at about 1/100 sec., and less. The shortest possible shutter speed setting is obtained when the stop lever 19 is shifted farthest in the direction toward the tongue 11c. Starting from this position, the tripping of the second shutter slide takes place at instants which are, in each case, later in time, the farther the stop lever 19 in the illustration of FIG. 1 is shifted toward the right until, finally, slightly above 1/100 sec., the tongue 11c does not reach the stop lever 19.

For the longer times which then follow, an electronically operating shutter speed control mechanism is provided, the main component of which is an electromagnet 25. The latter is connected in an electronic circuit (FIG. 2), consisting of an RC-member 26,27, the potential of which controls a flip-flop stage 28, the latter in turn, controlling the current flow in the magnet 25 via a transistor 29. For current supply, a battery 30 is provided. The resistor 26 of the RC-member is a variable resistor and is disposed coaxially but fixedly with respect to the axial cam 21. The axial cam 21 carries the wiper 32 cooperating with the resistor. This wiper moves across the resistor windings, when the axial cam rotates in a certain range.

The free end of the pawl 17 is associated with the electromagnet 25 as the armature thereof. When the magnet attracts, the lever 17 tilts in the clockwise direction in the same manner as if the stop lever 19 were lifted by the tongue 11c. In both cases, tripping of the pawl 17 is effected, i.e., the second shutter slide is freed.

The association of the axial cam 21 with the wiper 32 and the variable resistor 26 is provided so that the wiper 32 rests on a mere lead 26a to the resistor 26 as long as the cam is in a position wherein the stop lever 19 can still be shifted laterally. However, at the lowest point of the cam 21, a cam piece 21a follows, without any slope (FIGS. 2, 3, 4), and when the connecting piece 20 rests on this cam piece 21a, the stop lever 19 is in such a far-retracted position that it is no longer contacted by the tongue 11c. In this position, the wiper 32 comes into engagement with the windings of the variable resistor 26. Previously, the wiper 32 merely rested on the lead 26a, so that the fixed resistor 34 was the controlling resistance in the RC-circuit. Thereby, the electronic exposure time was adjusted, in a constant fashion, to 1/100 sec. In other words, even if the time setter 22 was set to an exposure time shorter than 1/100 sec., for example to 1/500 sec., the tripping of the second blind was effected mechanically after the expiration of 1/500 sec. and the second blind moved and closed the image apertures. However, independently thereof, the electromagnet, after 1/100 sec., received a current surge which would have resulted in an electromagnetic triggering, if such triggering had not been effected previously in a mechanical fashion.

Figure 2:
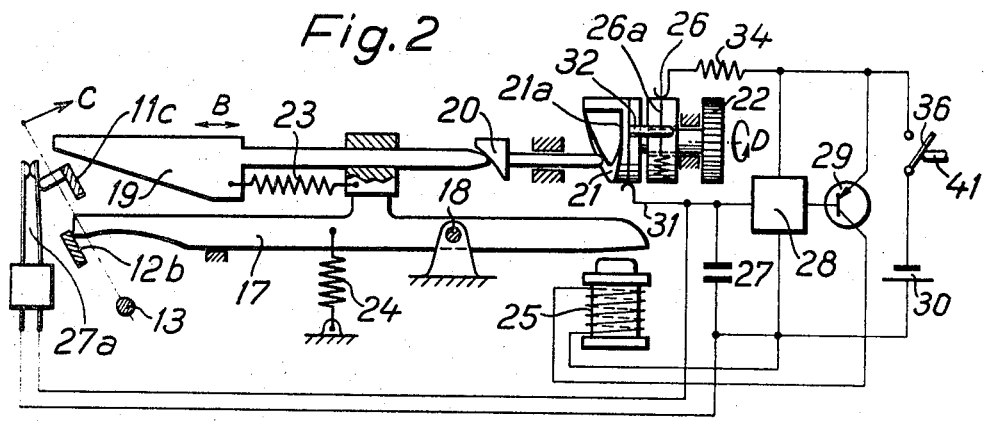
FIG. 2 shows a schematic lateral view of the speed control device in a first embodiment.

The function of the above-described components will be briefly explained once again in connection with FIG. 2. First of all, it is assumed that the connecting piece 20 rests on the highest point of the axial cam 21. This setting corresponds to the shortest adjustable exposure time. In this position, the stop lever 19 is in the left-most position on the drawing of FIG. 2.

If, now, the tongue 11c, for example, pivots about the axle 13 in the direction of Arrow C, it impinges from below on the stop lever 19, whereby the pawl 17 is released. However, if the time setter 22 is rotated in the direction of Arrow D, the stop lever 19 is displaced, under the force of the spring 23, toward the right to an increasing extent, so that the tongue 11c impinges on the stop lever 19 at an ever later point in time, i.e., the exposure time is prolonged. When, finally, the connecting piece 20 rests on the bottom of the cam, i.e., on the cam track 21a, the stop lever 19 has left the zone of movement of the tongue 11c. However, at this moment, the wiper 32, connected to the axial cam 21 and the time setter 22, comes into contact with the resistor windings 26. First, the shortest electronically controlled shutter speed is still set, which is approximately 1/100 sec. The capacitor 27 is first short-circuited by the shunting contact 27a. Upon tripping the first shutter slide, the tongue 11c moves away from the contact 27a, so that the latter is opened and thus the short circuit of the capacitor 27 removed. The potential of the time base circuit begins to rise. Once a certain potential is reached, the trigger 28 flips over, and the transistor 29 becomes conductive, so that the magnet 25 is energized by the current. The magnet attracts and tilts the pawl lever 17 about the axle 18, so that now the second shutter slide is freed to become operative.

If the time setter 22 is further turned in the direction of Arrow D, the resistance of resistor 26 becomes larger. This also increases the time constant of the RC-member, so that the magnet 25 receives its current at a constantly later instant, calculated from the tripping of the first shutter slide.

Figure 3:
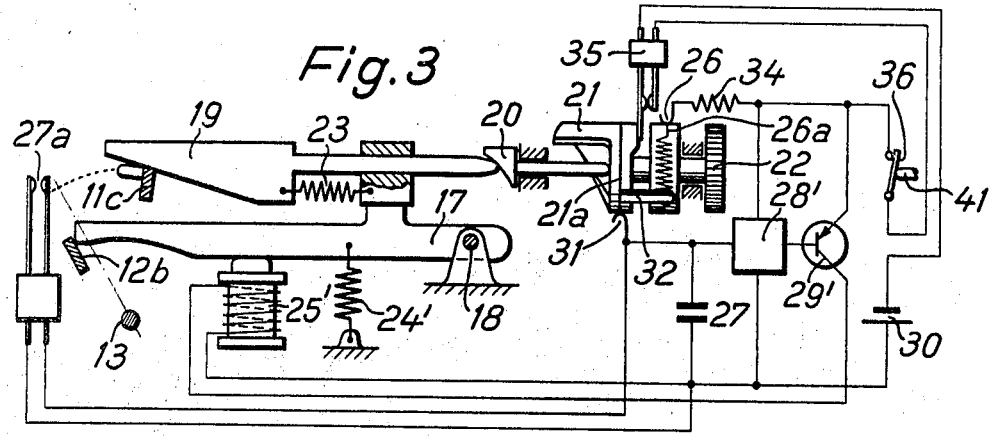
FIG. 3 shows a schematic lateral view of the speed control device in a second embodiment.

FIG. 3 shows an embodiment of the invention wherein the magnet 25' is not connected in the form of an attracting magnet, but as a holding magnet. The contact 35 is additionally inserted in the circuit. The contact 35 is a main contact which is closed by the cam body carrying the axial cam 21 only when a transition is effected at the time setter from the mechanical speed control to the electronic speed control, so that the entire electronic control circuit is supplied with current in this condition. Contact 36 is a series contact which is closed, as in FIG. 2, upon actuation of the camera shutter release immediately prior to the release of the first shutter slide. The flip-flop stage 28' and the transistor 29' are connected in such a manner that the transistor 29' is conductive in this condition.

The difference between the embodiment of FIG. 3 and that of FIG. 2 resides in the following:

In the embodiment of FIG. 2, the pawl 17, in the case of mechanical speed control, is pivoted by the tongue 11c and, in the case of electronic speed control, by the magnet 25. In the embodiment of FIG. 3, the pawl 17, in contrast thereto, is tripped solely by the tongue 11c in the case of mechanical as well as in the case of electronic speed control. This tripping action is prevented, in the case of electronic speed control, by the holding magnet 25' merely for the duration of the exposure time.

Thus, whereas in the example according to FIG. 2 the electronic tripping at the threshold value of 1/100 sec. remains in effect even in the range of short exposure times and the mechanical tripping in case of exposure times of less than 1/100 sec. is merely superimposed, so to speak, on the electronic tripping action, the converse condition exists in the embodiment according to FIG. 3. In the latter, the mechanical tripping is constantly in effect, and starting with 1/100 sec. in the direction of longer periods of time, the electronic tripping is superimposed on this mechanical tripping, which electronic tripping prevents the mechanical tripping until the longer period of time has passed. In both cases, the formation of a gap between the mechanical and the electronic shutter speed control is avoided.

The illustration of FIG. 3 shows a condition during electronic speed control. The contacts 35 and 36 are closed, and the first shutter slide has already moved along. However, whereas in the embodiment of FIG. 2 the tongue 11c, when the electronic speed control is set, does not reach the stop lever 19, the tongue 11c always impinges on this lever 19 in the embodiment according to FIG. 3. When the electronic speed control is actuated, the tongue 11c does this in its final position of rotation, wherein it presses against the stop lever 19. However, since current is flowing in the holding magnet 25', the tongue 11c is first unable to pivot the pawl 17.

However, with the beginning of the movement of the first shutter slide, the contact 27a has also been opened, so that, just as in the example of FIG. 2, the potential of the time base circuit rises. After an interval depending on the setting of the resistor 26, the tripper 28' flips over, and transistor 29' is non-conductive. Thus, the magnet 25' is without current, and at this point in time the force of the tongue 11c is sufficient for pivoting the pawl 17 out of its blocking position, so that now the second shutter slide is freed for movement.

Figure 4:
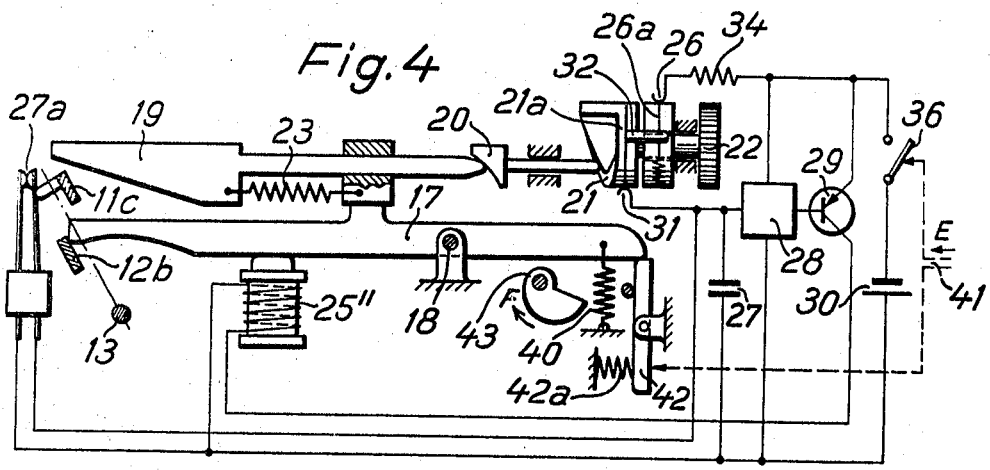
FIG. 4 shows a schematic lateral view of the speed control device in a third embodiment.

In FIG. 4, another embodiment is illustrated wherein likewise a holding magnet 25" is employed. The force of the magnet acts against the force of a tension spring 40 hingedly connected to the other lever end of the pawl. If the release 41 is pressed in the direction of Arrow E, the contact 36 is closed, first of all, and thus the magnet 25" is supplied with current. Furthermore, immediately thereafter, the blocking means 42 is pivoted out of the range of the pawl 17 against the force of the compression spring 42a. Thereby, the tension spring 40 can become effective. However, the force of this latter spring is insufficient for overcoming the force of the holding magnet 25", so that the pawl 17 at first remains in its illustrated locking position. In contrast thereto, if, during the movement of the first shutter slide, the tongue 11c comes into engagement with the inclined surface of the stop lever 19, this additional force is sufficient for overcoming the force of the electromagnet so that the pawl 17 pivots out of its locking position. This is the case in the interval from the shortest exposure time up to about 1/100 sec. In contrast thereto, if the stop lever 19 is shifted toward the right to the operative range of the tongue 11c, the spring 40 can only become effective after the magnet 25" is without current. This takes place at different times, depending on the setting of the variable resistor 26 in a time interval longer than 1/100 sec.

Also in this embodiment, the variable resistor is provided with the lead 26a, so that even when shorter speeds which are to be tripped mechanically are set, the magnet 25" is without current after 1/100 sec. Superimposed on this electronic time, constantly set to below 1/100 sec., are the shorter exposure times to be tripped mechanically.

Furthermore, a cam disk 43 is additionally provided which is geared to the shutter cocking lever of the camera. Upon actuation of the shutter cocking lever, this disk rotates in the direction of Arrow F and returns into its illustrated starting position when the shutter cocking lever has been released. Along its way, this disk presses the pawl 17 into its locking position behind the tongue 12b, the locking means 42 simultaneously returning into its position underneath the pawl 17 under the force of the compression spring 42a.

We claim:

1. A photographic camera comprising first and second shutter blinds, first means for releasably locking said first shutter blind in a retracted position, second means for releasably locking said second shutter blind in a retracted position, drive means for driving said first and said second shutter blinds from a retracted position to a released position upon release of said first and said second means, a lever movably attached to said second means with one end of said lever extending into the path of travel of said drive means, a cam adjacent the second end of said lever for adjusting the position of said one end in the path of travel of said drive means, such that said drive means strikes said lever and releases said second means, a variable resistor connected with said cam and movable simultaneously with said cam, an electromagnet adjacent said second means and a timing circuit connecting said variable resistor and said electromagnet such that on the expiration of a selected time interval said electromagnet is energized and releases said second means.

2. The apparatus of claim 1, including means actuating said drive means and said electromagnet simultaneously.

3. The apparatus of claim 1, wherein said electromagnet is a holding magnet, said second shutter blind has as said second means for releasably locking said second shutter blind a pawl, spring means positioned against said pawl, said pawl held in its locking position against the force of said spring means by said holding magnet, and including a mechanical member for releasing said pawl from its locking position during the movement of said first shutter blind.

4. The apparatus of claim 1, wherein said camera has as said second means for releasably locking said second shutter blind a pawl, a mechanical member movable together with said first shutter blind for forcing the release of said pawl from its locking position, said timing circuit and said electromagnet comprising a holding magnet connected to said pawl whereby said mechanical member is actuated only when said magnet is without current.

5. The apparatus of claim 4, wherein there is provided between said first shutter blind and said pawl a connecting lever, speed control setting means geared to said connecting lever, said connecting lever being displaceable upon adjustment of said speed control setting means and being pivotable in all positions, spring means bearing against said connecting lever, said connecting lever being in contacting engagement with said pawl and being pivotably mounted whereby said connecting lever can act against the force of spring means to displace said pawl from its locking position.

* * * * *